M. NICOLAS.
ELECTRIC BATTERY.
APPLICATION FILED FEB. 21, 1907.
937,324.
Patented Oct. 19, 1909.
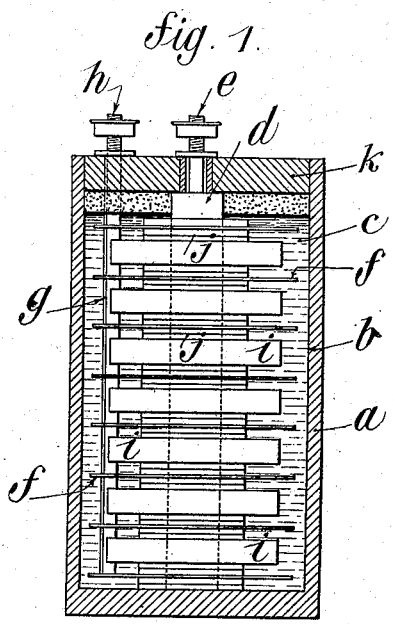
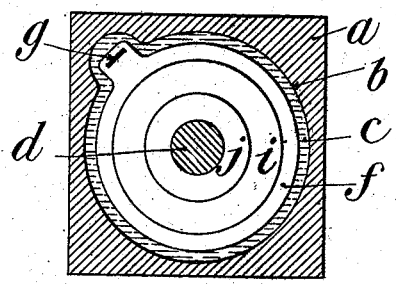
Witnesses:—
Inventor:—
Maurice Nicolas
by H. B. Willson & co.
Attorneys

UNITED STATES PATENT OFFICE.

MAURICE NICOLAS, OF PARIS, FRANCE.

ELECTRIC BATTERY.

937,324.  Specification of Letters Patent.  Patented Oct. 19, 1909.

Application filed February 21, 1907. Serial No. 358,650.

*To all whom it may concern:*

Be it known that I, MAURICE NICOLAS, a citizen of the Republic of France, residing at 37 Avenue Felix Faure, Paris, in the Republic of France, engineer, have invented certain new and useful Improvements in Electric Batteries, of which the following is a specification.

My invention relates to improvements in electric batteries, and has for its object to so construct a battery of this character that the liquid in the same shall be motionless and that in the said battery there shall be zinc washers and intermediate depolarizing disks threaded on a carbon electrode forming the vertical axis of the element, whereby the arrangement of the electrodes presents a large surface under a very small volume, and the resistance within the element is very small.

The cover or casing of the battery is composed of a block of wood suitably hollowed out, and hermetically closed by sealing with wax in order to avoid the vaporization of the liquid.

One embodiment of my invention is shown in the accompanying drawing in which:

Figure 1 is a vertical sectional view of a battery element according to this invention; and Fig. 2 is a horizontal sectional view of the same.

Referring to the drawing, $a$ designates a square shaped block of wood within which is provided a cylindrical cavity $b$, to receive the energizing liquid $c$, and the electrodes. The said electrodes are composed of a carbon cylinder $d$ provided with a current taking screw $e$, and of a series of zinc washers $f$ threaded onto though properly separated from the cylinder $d$ and which are soldered to a collecting blade $g$, the latter being connected with another current-taking screw $h$. Between the said washers $f$ are located depolarizing disks $i$ composed of manganese bronze, graphite, and retort carbon, pulverized, mixed, and strongly agglomerated. Felt washers $j$ separate the washers $f$ from the disks $i$. The element is hermetically closed by means of a wax or other suitable lid $k$.

A plurality of battery elements such as those hereinbefore described may be grouped together in one and the same square shaped block of wood, within which are provided as many cylindrical cavities as there are elements. This kind of wooden cover or casing in a single piece is very strong, quite air-tight, and makes the battery very easy to carry and ship. An agglomeration of sawdust may take the place of the wood.

My improved battery is chiefly characterized by the arrangement of the zinc washers and the intermediate depolarizing disks on a central carbon electrode, the whole hermetically inclosed with an energizing liquid within a hollow block of wood.

What I claim and desire to secure by Letters Patent is:

1. A battery comprising the combination of a cylinder of carbon, of a series of zinc washers around the said cylinder, of the disks of agglomerated depolarizing material located around the said cylinder between the zinc washers, and of the felt washers located around the cylinder between the zinc washers and the depolarizing disks.

2. In a battery the combination with a carbon, of zinc washers arranged around said carbon and disks of agglomerated depolarizing material, said washers and disks being arranged alternately.

In testimony, that I claim the foregoing as my invention, I have signed my name in presence of two subscribing witnesses.

MAURICE NICOLAS.

Witnesses:
 HANSON C. COXE,
 MAURICE ROUX.